UNITED STATES PATENT OFFICE.

EMIL ABDERHALDEN, OF HALLE-ON-THE-SAALE, GERMANY.

POTENTIATED SERA AND PROCESS OF MAKING THEM.

1,151,536.

Specification of Letters Patent. Patented Aug. 24, 1915.

No Drawing. Application filed May 14, 1915. Serial No. 28,195.

*To all whom it may concern:*

Be it known that I, EMIL ABDERHALDEN, doctor of medicine, professor of physiology at the University of Halle, Prussia, Germany, citizen of the German Empire, residing at Halle-on-the-Saale, Germany, have invented new and useful Improvements in Potentiated Sera and Process of Making Them, of which the following is a specification.

This invention relates to new sera and to new methods for making them.

It comprises as new products, sera or animal fluids having a greatly augmented power for destroying or lysing (dissolving) certain proteins such as carcinoma albumin, sarcoma albumin, etc., and capable, when injected into an animal afflicted with carcinoma, sarcoma, or certain infectious diseases, of manifesting thereon a distinct curative effect.

By my experiments I have demonstrated that after the introduction of complex substances foreign to the blood, ferments appear in the blood plasma which are able to hydrolyze these complex substances. This observation has been utilized by me for the purpose of producing artificial protective ferments against carcinoma albumin, sarcoma albumin, etc. For instance, carcinoma tissue or an extract or autolysate of such tissue is injected under the skin of a dog, and 2 to 5 days after the injection the blood plasma of the animal is capable of splitting carcinoma albumin. This observation has been utilized for the preparation of antisera against carcinoma, sarcoma, and certain infectious diseases.

For the purpose of describing my present invention, I call the products hitherto known: "one animal" sera. My potentiated sera are made from these "one animal" sera as described below in greater detail.

If, for instance, carcinoma tissue is injected into the abdominal cavity or under the skin of the animal, or an extract of such tissue or an autolysate or the expressed juice is introduced into the blood channels, then after 2 to 5 days protective ferments are found in the blood plasma. The blood serum of such an animal is now able to hydrolyze carcinoma albumin as well as other constituents of carcinomatous tissues. The presence of the ferments is determined by placing the serum of the animal in a dialyzer and allowing it to act upon carcinomatous tissue, and then examining the dialyzed material for cleavage products of albumin according to the customary methods. Furthermore, through the action of acid upon carcinoma tissue, peptones can be prepared, and these, together with the corresponding serum, can be polarized. Continued observation at 37 deg. shows that the rotary power of the mixture is permanently changed. If for such experiments serum from a normal animal which has not been injected with carcinomatous tissue be used, then no splitting up of the constituents of the carcinoma tissue takes place. The same applies to any given substratum, microorganisms, etc.

Now I have made the astonishing discovery that if serum is taken from an animal thus treated and injected into another animal, the serum of the second test animal acquires the same properties, but in an enhanced degree. By repeated or successive transference of protective ferments from animal to animal or from one human being to another, the proteolytic action of the thus obtained potentiated serum in contact with certain substrata is augmented to an extraordinary extent. These observations offer the possibility for the first time of preparing potentiated sera which are rich in certain protective ferments. As has already been demonstrated by many practical experiments, it is possible with the aid of such potentiated sera to successfully treat tumors, etc. The fact that protective ferments can be transferred from animal to animal and that thus an increased ferment action can be obtained is also of the greatest importance for the reason that it becomes possible in this way to exclude any danger of an infection through the injected material, for the serum of an animal that has been directly injected with tumor material might still contain living cells or microörganisms.

The new procedure affords for the first time the possibility of preparing curative sera for cancer, etc., on a large scale; for by the only method of preparation hitherto known, consisting in a single injection, but a limited amount of serum was obtainable, namely, that which could be secured from the injected animal. For the production of additional amounts of the "one animal" serum hitherto known other animals had again to be injected with fresh tumor material, which (especially in the case of internal tumors) is difficult to secure. The new procedure, however, permits of an injection of a large number of other animals with material derived from the one first injected, and thus practically unlimited amounts of serum of increased potency can be obtained.

The potentiated serum for the treatment of infectious diseases is also obtained from the hitherto known "one animal" serum. In this case the "one animal" serum is drawn from the first animal already at the end of 3 to 5 days. Such a serum still contains protective ferments whereas in the ordinary serum which has been drawn from the animal after a period of 5 days these ferments have disappeared. After that time the antitoxin is formed and the ferments appear to be eliminated or inactivated. In view of this unexpected and pecular action of the organism in causing the appearance and soon afterward the disappearance of protective ferments, it is necessary to maintain a careful time-control of the process, and it is often desirable to withdraw the serum from each animal in its turn when the protective ferment content of the serum in such animal has about reached a maximum. The "one animal" diphtheria serum or the "one animal" tuberculosis serum is then potentiated by repeated injections from animal into animal until the desired strength in protective ferments is obtained. The "one animal" serum after being injected into the second animal is drawn from this animal at the end of 12 to 24 hours. Each subsequent serum exhibits the same characteristic increase of action which can be further enhanced by repeated injections into new test animals.

Example: The carcinoma, for instance, uterine carcinoma, which must be completely fresh, is chopped up fine, and this material is injected into a normal horse, either under the skin or into the abdominal cavity, or even into the blood vessels. The carcinoma tissue to be injected can be previously submitted to autolysis (autodigestion) in the customary manner or the tissue may be subjected to strong pressure and the fluid thus obtained used for injection. At the end of 5 days, at the earliest after 2 days, blood is withdrawn, the serum allowed to separate, and then examined to determine whether it is capable of splitting carcinoma tissue as indicated by the production of dialyzable substances when it is allowed to react with said tissue. Such a serum, responding positively to the above test, suitably filtered through a Chamberland filter is injected into a second normal horse or into some other animal. After 3 days blood is withdrawn from the animal and its serum will be found to exhibit a more marked cleavage power. By further inoculations a serum very rich in protective ferments can be prepared. This potentiated serum has the valuable property that, if injected into human beings suffering with carcinoma, it manifests distinct curative effects. This has already been demonstrated by many clinical tests.

I claim:—

1. A potentiated serum containing protective ferments and capable of reacting with a protein foreign to the serum to produce a substantially greater proportion of dialyzable substances than can be produced by a one animal serum reacting with said protein.

2. A serum obtainable by the successive transference from one animal to another through a series of animals, of an animal fluid containing protective ferments induced by a protein normally foreign to said animal fluid.

3. A potentiated serum containing protective ferments and capable of reacting with a cancerous tissue to produce a substantially greater proportion of dialyzable substances than can be produced by a one animal serum reacting with said protein.

4. A potentiated serum obtainable from a "one animal" serum by injection thereof into, and withdrawal from, at least one other animal, and characterized by being rich in protective ferments, being free from living cells and microörganisms, and exhibiting a powerful proteolytic action in contact with cancerous tissue.

5. A potentiated serum obtainable from a "one animal" serum by injection thereof into, and withdrawal from, at least one other animal, and characterized by being rich in protective ferments, being free from living cells and microörganisms, and exhibiting a powerful proteolytic action in contact with carcinomatous tissue.

6. The process of producing a potentiated serum which comprises injecting a serum containing protective ferments specific to a protein foreign to the serum obtained from one animal into a second animal, and then withdrawing serum containing an increased proportion of such ferments from said second animal, substantially as described.

7. The process of producing a potentiated serum which comprises successively transferring serum containing protective ferments specific to a protein foreign to the serum from one animal to another through a series of animals and withdrawing serum containing an increased proportion of such ferments from the last animal of the series, substantially as described.

8. The process of producing a potentiated serum which comprises injecting into an animal a serum, containing protective ferments and capable of exerting a proteolytic action when in contact with cancerous tissue, and then withdrawing serum containing an increased proportion of protective ferments from said animal, substantially as described.

9. The process of producing a potentiated serum which comprises injecting into an animal a serum, containing protective ferments and capable of exerting a proteolytic action when in contact with carcinomatous tissue, and then withdrawing serum containing an increased proportion of protective ferments from said animal, substantially as described.

10. The process of producing a potentiated serum which comprises successively transferring serum containing protective ferments from one animal to another through a series of animals and withdrawing serum from the last animal of the series, each withdrawal being made when the protective ferment content of the serum in the respective animal is at about a maximum, substantially as described.

11. A process of producing a serum rich in protective ferments which comprises injecting cancerous tissue into a test animal to induce the formation of protective ferments therein, withdrawing serum from said animal before the protective ferments have disappeared, injecting such serum into a second animal to induce the production of a serum containing a greater proportion of protective ferments and repeating the withdrawal and injection into fresh animals until a serum of the desired strength is obtained, substantially as described.

In testimony whereof I have hereunto set my hand in the presence of two subscribing witnesses.

EMIL ABDERHALDEN.

Witnesses:
  RUDOLPH FRICKE,
  WM. P. KENT.